Aug. 25, 1925.

W. G. COX

BUMPER

Filed Feb. 4, 1924

1,551,371

Inventor

W. G. Cox

By [signature]

Attorney

Patented Aug. 25, 1925.

1,551,371

UNITED STATES PATENT OFFICE.

WILLIAM G. COX, OF CLEVELAND, OHIO, ASSIGNOR TO THE EATON AXLE AND SPRING COMPANY, OF CLEVELAND, OHIO, A CORPORATION OF OHIO.

BUMPER.

Application filed February 4, 1924. Serial No. 690,364.

*To all whom it may concern:*

Be it known that I, WILLIAM G. COX, a citizen of the United States, and a resident of Cleveland, county of Cuyahoga, State of Ohio, have invented certain new and useful Improvements in Bumpers, of which the following is a specification.

This invention relates to bumpers or guards for motor vehicles and has for one of its objects the provision of a bumper of comparatively simple construction, relatively light in weight and yet sufficiently strong to meet the requirements of a satisfactory bumper.

A further object of the invention is to provide a construction that will lend itself to modern manufacturing methods for production on a large scale and at a comparatively low cost.

Other objects of the invention and the features of novelty will be apparent from the following description taken in connection with the accompanying drawings, of which:

Figure 1:
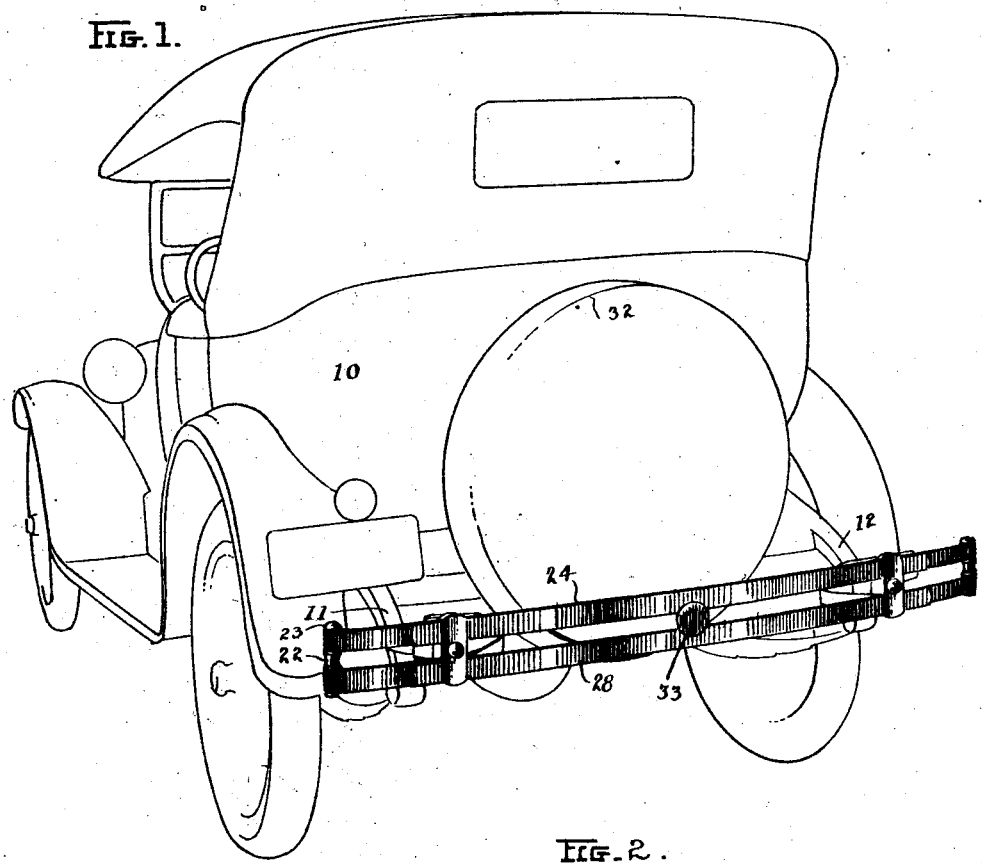
Figure 1 is a perspective view of the rear of a motor vehicle having my invention applied thereto.
Figure 2:
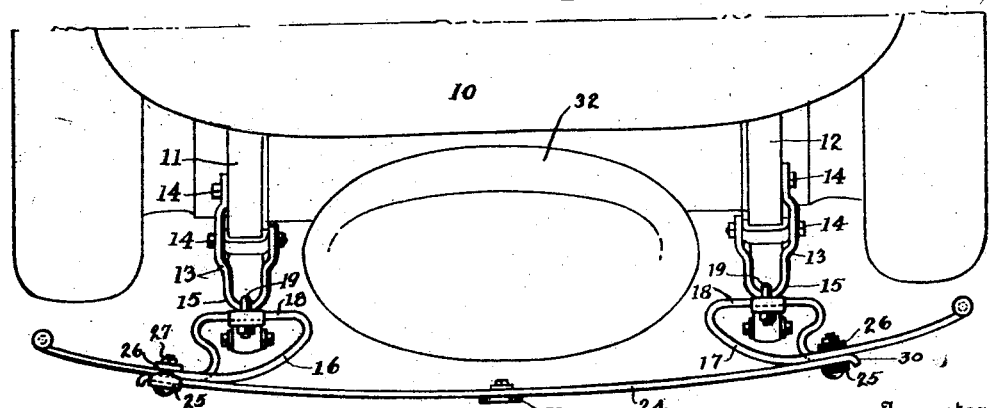
Fig. 2 is a plan view of the same with certain parts in section.

Referring to the drawings, 10 indicates, generally, an automobile, the side frame members of which are indicated at 11 and 12. Attached to each of the frame members 11 and 12 is a bracket 13 which may be secured to the frame member by bolts 14 in any preferred manner but which preferably comprises the looped portion 15 to which the bumper may be attached.

Figure 3:
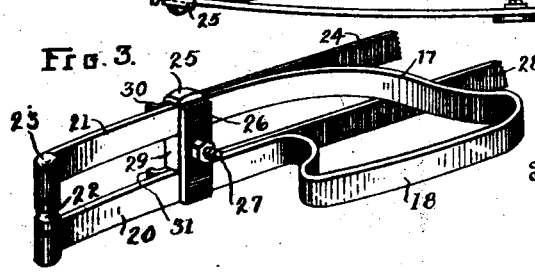
Fig. 3 is a perspective view of one of the ends of the bumper as seen from the vehicle side thereof.

According to my present invention the bumper comprises two similarly formed oppositely arranged looped members 16 and 17, the middle portion of the looped part of which is substantially straight, as indicated at 18, and extends transversely of the vehicle and is adapted to be secured to the looped part 15 of the bracket by means of a U-bolt 19 or other suitable device. The straight portions 18 of the members 16 and 17 provide for attachment of the bumper to vehicles having different widths of frame. The members 16 and 17 are made of flat spring material and their end portions are relatively offset vertically, as best shown in Fig. 3, and project laterally outward and may form the ends of the bumper. These laterally projecting end portions are indicated at 20 and 21 in Fig. 3 and are spaced apart by a spool 22 and connected together by a bolt or rivet 23 which projects through the spool 22 and through suitable eyes formed in the ends 20 and 21. The corresponding ends 21 of the members 16 and 17 are connected by a flat bar 24 of spring material, which bridges the central impact area of the bumper and has its ends arranged flatwise against the ends 21 and secured thereto by suitable clamping devices consisting of a vertically arranged member 25 and a plate 26 which are clamped together by a bolt 27, there being one of these clamping devices at each end of the bumper and these devices also clamping the ends of the bar 28 to the corresponding ends 20 of the members 16 and 17. The bar 28 is vertically spaced from the bar 24, but in alignment therewith, and also bridges the central impact area of the bumper. The members 25 have lugs 29 which project between the vertically spaced bars and maintain them in proper relation.

The ends of the bars 24 and 28 may be turned outwardly, as indicated at the points 30 and 31 which will prevent these ends from being drawn through the clamping devices under the influence of a very severe blow against the central impact area of the bumper.

The construction above described has the advantage of being light and resilient and yet sufficiently strong to meet service requirements. It also has the advantage of providing a construction that is equally adapted to the front or the rear of the vehicle and when used at the rear will not interfere with the usual arrangement of the spare tire, which is indicated at 32. If desired a clamp 33 may be employed at the middle of the bars 24 and 28 for the purpose of securing them together at that point.

Having thus described my invention, what I claim is:

1. A vehicle bumper comprising two oppositely arranged looped members each having a substantially straight portion at the middle part of the loop therein extending transversely of the vehicle and adapted to be connected with the vehicle frame, the ends of each of said members projecting laterally outward, and a bar connected to said members and bridging the central impact area of the bumper.

2. A vehicle bumper comprising two oppositely arranged looped members each having a substantially straight portion at the middle part of the loop therein extending transversely of the vehicle and adapted to be connected with the vehicle frame, the ends of each of said members projecting laterally outward and forming the ends of the bumper, and a bar connected to the end portions of said members and bridging the central impact area of the bumper.

3. A vehicle bumper comprising two oppositely arranged looped members each having its looped portion arranged for connection with the vehicle frame and with its ends relatively offset and in vertical alignment and projecting laterally outward, and a plurality of bars connected to the end portions of said members and bridging the central impact area of the bumper.

4. A vehicle bumper comprising two oppositely arranged looped members each having its looped portion arranged for connection with the vehicle frame and with its ends relatively offset and in vertical alignment and projecting laterally outward, the corresponding ends of said members being in horizontal alignment, and vertically spaced bars having their respective ends connected to corresponding ends of said members and bridging the central impact area of the bumper.

5. A vehicle bumper comprising two oppositely arranged looped members each having its looped portion arranged for connection with the vehicle frame and with its ends relatively offset and in vertical alignment and projecting laterally outward and forming the ends of the bumper, the corresponding ends of said members being in horizontal alignment, and vertically spaced bars bridging the central impact area of the bumper and having their respective ends connected to corresponding ends of said members.

6. A vehicle bumper comprising two similarly shaped but oppositely arranged looped members, each having a substantially straight portion in the loop thereof adapted to be arranged transversely of the vehicle and to be connected to the frame thereof, said members being formed of flat spring material and each having its end portions relatively offset and projecting laterally outward in vertical alignment to form the ends of the bumper, horizontally arranged flat bars bridging the central impact area of the bumper and having their respective ends arranged flatwise against the corresponding end portions of said members, and means for clamping said bars and the end portions of said members together.

In testimony whereof I affix my signature.

WILLIAM G. COX.